United States Patent
Omi

[11] Patent Number: 5,995,229
[45] Date of Patent: Nov. 30, 1999

[54] OPTICAL DISPLACEMENT MEASURING APPARATUS

[75] Inventor: Toshihiro Omi, Kanagawa, Japan

[73] Assignee: Mitutoyo Corporation, Kanagawa, Japan

[21] Appl. No.: 09/158,102

[22] Filed: Sep. 22, 1998

[30] Foreign Application Priority Data

Sep. 26, 1997 [JP] Japan ................................ 9-262295

[51] Int. Cl.⁶ .................................................. G01B 11/00
[52] U.S. Cl. ................................................ 356/374; 33/707
[58] Field of Search .................................. 356/373, 374, 356/395; 33/707; 250/237 G

[56] References Cited

U.S. PATENT DOCUMENTS

| | | | |
|---|---|---|---|
| 4,340,814 | 7/1982 | DiCiaccio et al. | 250/237 G |
| 4,632,559 | 12/1986 | Brunsting | 356/446 |
| 4,983,828 | 1/1991 | Stephens | 250/237 G |
| 5,028,139 | 7/1991 | Kramer et al. | 356/446 |
| 5,109,236 | 4/1992 | Watanabe et al. | 250/227.28 |

*Primary Examiner*—Richard A. Rosenberger
*Attorney, Agent, or Firm*—McDermott, Will & Emery

[57] ABSTRACT

In an optical encoder having a reflection-type scale and a sensor head 1, the sensor head 1 is formed of a resin-molded block 10. The block 10 has a hole 15 opened to be opposed to the scale, and interconnection lines. In the hole 15, a light emitting device 20 is buried so as to irradiate the scale. A device substrate 30, on which a light receiving IC chip 32 is mounted for receiving the reflected light from the scale, is attached to the front surface of the block 10. The interconnection lines 12, to which the light emitting device 20 and the IC chip 32 are connected, are led to external circuits through an FPC substrate 40.

9 Claims, 6 Drawing Sheets

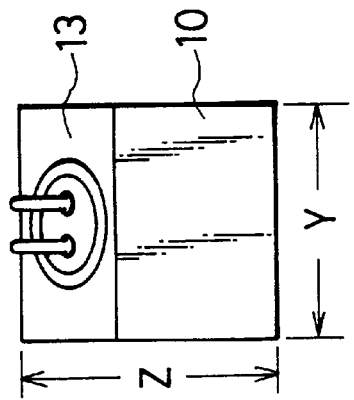
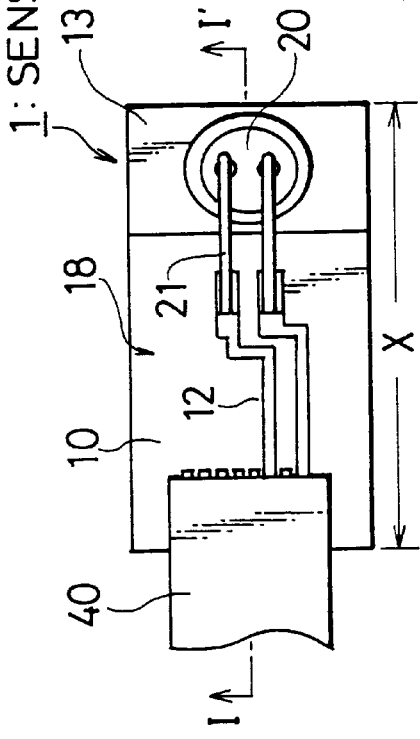
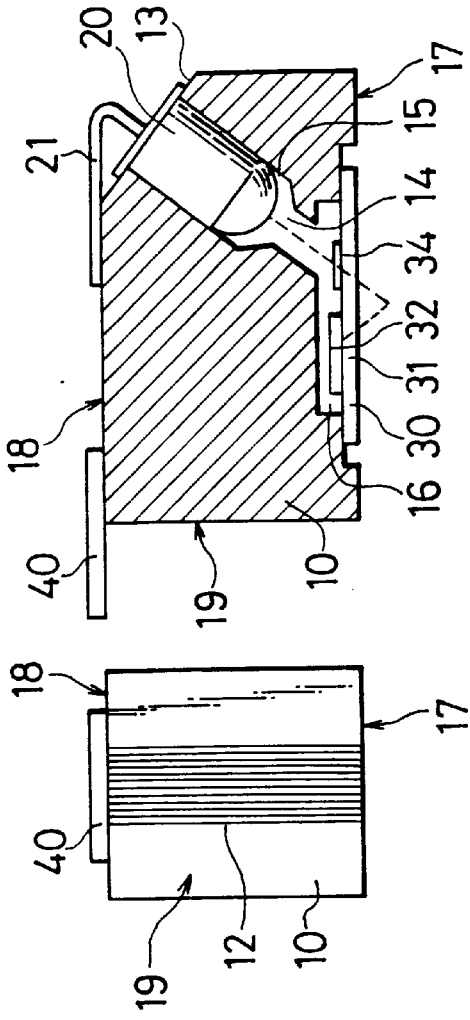
FIG.1A  FIG.1B  FIG.1C  FIG.1D

OPTICAL DISPLACEMENT MEASURING APPARATUS

BACKGROUND OF THE INVENTION

1. Field of the Invention

The present invention relates to an optical displacement measuring apparatus, especially relates to a small displacement measuring apparatus having a reflection-type scale and a sensor head on which a light emitting device and a light detecting device are mounted.

2. Prior Art

Optical encoders are classified into a reflection-type encoder that detects reflected light from scale gratings, and a transmission-type encoder that detects transmitted light from scale gratings. In these encoders, the reflection type encoder is more advantageous for miniaturizing and thinning than the transmission-type encoder, because a sensor head can be disposed on one side of the scale so as to include both a light emitting portion and a light detecting portion. However, in practice, the reflection-type encoder has such a complicated structure that the sensor head is constructed by combining a substrate on which a light detecting device is mounted, a light emitting device such as an LED, and a print circuit board to which the devices are connected, on an appropriate frame.

Therefore, the conventional reflection-type encoder is too complicated to be formed so as to be installed in a small X-Y table. Further, not only many steps are necessary for assembling the reflecting-type encoder, but also it is difficult to automatize the assembling process and mass-producing process of the encoder.

SUMMARY OF THE INVENTION

An object of the present invention is to provide such a reflection-type optical displacement measuring apparatus that the structure is simple, and that miniaturization, thinning, process automation and mass-production of the apparatus can be easy.

According to a first aspect of the present invention, an optical displacement measuring apparatus comprises a reflection-type scale and a sensor head opposite to the scale with a gap so as to be relatively movable, the sensor head irradiating the scale as to output a displacement signal, wherein the sensor head comprises; a resin-molded block having a hole, which is opened on a front surface opposed to the scale, and interconnection lines formed thereon; a light emitting device buried in the hole of the resin-molded block so as to irradiate the scale, the light emitting device being connected to the interconnection lines on the resin-molded block; a device substrate attached to the front surface of the resin-molded block; and a light detecting device mounted on the device substrate for detecting reflected light from the scale, the light detecting device being connected to the interconnection lines on the resin-molded block.

According to a second aspect of the present invention, an optical displacement measuring apparatus comprises a reflection-type scale and a sensor head opposite to the scale with a gap so as to be relatively movable, the sensor head irradiating the scale as to output a displacement signal, wherein the sensor head comprises: a resin-molded block having a concave mirror formed on a front surface to be opposed to the scale, and interconnection lines; a device substrate attached to the front surface of the resin-molded block; a light emitting device mounted on the device substrate for irradiating the concave mirror, the light emitting device being connected to the interconnection lines on the resin-molded block through the device substrate; and a light detecting device mounted on the device substrate for receiving a reflected light from the scale irradiated by the concave mirror, the light detecting device being connected to the interconnection lines on the resin-molded block through the device substrate.

Recently, such an interconnection integrating technology has been provided that a conductive film is plated on the entire surface of a resin-molded block, and patterned to interconnection lines three-dimensionally integrated on the upper surface, lower surface, and side surface. Such a module is known as an MID (Molded Interconnection Device). The feature of the present invention is to construct a sensor head of a reflection-type optical encoder as an MID module having a resin-molded block on which a suitable device and a device substrate are mounted.

The resin-molded block is formed to have a hole opposed to the scale. A light emitting device is buried in the hole. Further, a device substrate, on which a light detecting device is mounted, is attached to the front of the resin-molded block as to be opposed to the scale. As a result, a sensor head can be provided as a small module.

Alternatively, a concave mirror is formed on the front surface of the resin-molded block to be opposed to the scale. The device substrate is attached to the resin-molded block, on which a light emitting device is mounted so as to irradiate the mirror, and a light detecting device is mounted so as to receive a reflected light from the scale. By such a construction, a sensor head module can be obtained.

In the present invention, if necessary, a connecting device such as a flexible print circuit (FPC) board can be bonded on a suitable surface of the resin-molded block for leading the interconnection lines on the block to an external circuit.

According to the present invention, by use of a resin-molded block on which interconnection lines are three-dimensionally formed, a sensor module can be provided. Therefore, it is not necessary to use a complicated assembling mechanism, whereby the sensor head can be miniaturized and thinned. Since the sensor becomes thin, it is easy to install the sensor in a small gap or inside mechanism of, for example, an X-Y table. It is easy to not only mass-produce the resin-molded block on which interconnections are three-dimensionally formed, but also automatize the device and the device substrate mounting onto the block. As a result, a mass-productivity of the sensor head becomes high.

BRIEF DESCRIPTION OF THE DRAWINGS

Referring to the accompanying drawings, the present invention will be described in detail.

FIGS. 1A to 1D show the structure of a sensor head according to a first embodiment of the present invention;

DETAILED DESCRIPTION OF THE PREFERRED EMBODIMENTS

Figure 2:
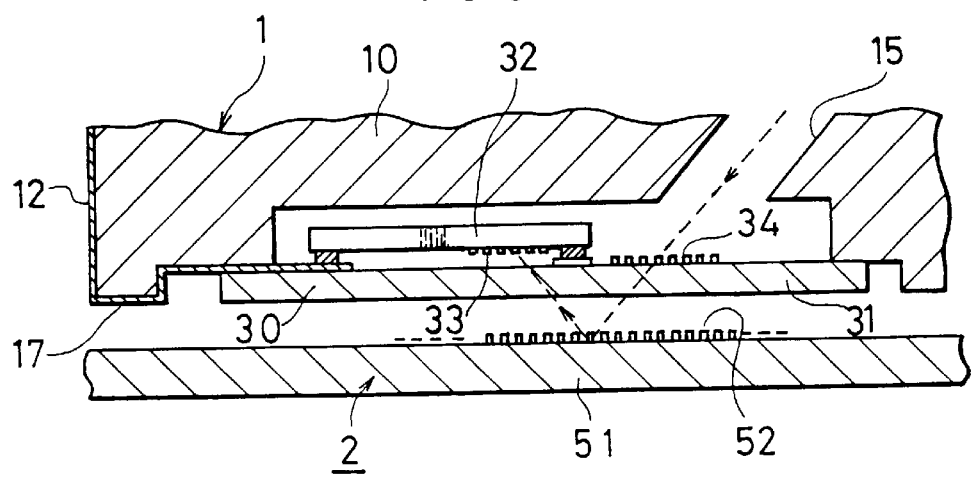
FIG. 2 is an enlarged sectional view of the sensor head.

FIGS. 1A, 1B, 1C and 1D are a plan view, I-I' sectional view of FIG. 1A, left side view and right side view of a sensor head 1 of a reflection-type encoder according to an embodiment of the present invention, respectively. As shown in FIG. 2, the sensor head 1 is disposed opposite to a reflection-type scale 2 with a predetermined gap so as to be relatively movable.

As shown in FIG. 1, the sensor head 1 is formed as an MID device with a resin-molded block 10, which is formed as a rectangular solid by injection molding. On the entire surface of the resin-molded block 10, a conductive film such as copper films is plated. The conductive film is patterned to interconnection lines 12 which are three-dimensionally integrated on the block 10. The resin-molded block 10 has a hole 15 which is opened on a front surface 17 of the block 10. The front surface 17 is to be opposed to the scale 2, as shown in FIG. 2. The hole 15 is formed through the block 10 from the front surface 17 to the rear surface 18. In detail, at an end portion of the rear surface 18 of the resin-molded block 10, an inclined plane 13 is formed. A hole 15 is slantways formed through the resin-molded block 10 from the inclined plane 13 to the front surface 17 in such a manner as to be perpendicular to the inclined plane 13.

In the hole 15, a light emitting device 20 such as an LED is buried, whereby the opening 14 of the hole 15 serves as a window for irradiating the scale 2. In this embodiment, the hole 15 is formed at the same time of injection molding. Alternatively, the hole 15 can be formed after the block 10 is injection-molded. The terminals of the light emitting device 20 are connected to the interconnection lines 12 on the rear surface 18 of the block 10.

On the front surface 17 of the resin-molded block 10, a groove 16 is formed with two steps. A device substrate 30 is attached to the front surface 17 of the block 10. Since the groove 16 is formed, the device substrate 30 is disposed opposed to the block 10 with a gap. The substrate 30 is formed of a glass substrate 31 as to be transparent. As shown in FIG. 2, a light detecting IC chip 32 is previously face-down-bonded (flip-chip bonded) on the glass substrate 31. The IC chip 32 includes light detecting device array (for example, photodiode array) 33, current-voltage converting circuits (not shown), and so on. Thus, the IC chip 32 is disposed between the block 10 and the substrate 31.

In this embodiment, on the glass substrate 31, a light-source side index scale 34 with gratings is also formed for modulating the output light from the light emitting device 20 so as to irradiate the scale 2. A chip condenser (not shown), which is connected to the power supply terminal of the IC chip 32, is also mounted on the substrate 31 for noise cutting.

The terminals of the light receiving IC chip 32 are, as shown in FIG. 2, connected to the interconnection lines 35 formed on the glass substrate 31. The interconnection lines 35 are connected to the interconnection lines 12 on the resin-molded block 10 when the device substrate 30 is bonded to the resin-molded block 10, thereby being led to the rear surface 18 through the interconnection lines 12 on the side surface 19, as shown in FIG. 1C.

On the rear surface 18 of the resin-molded block 10, an FPC substrate 40 is bonded on the interconnection lines 12, which is formed on the block 10 so as to be connected to the light emitting device 20 and the FPC substrate 40, for leading the interconnection lines 12 to external circuits (not shown). It should be appreciated that suitable connecting devices can be used in place of the FRC substrate 40.

Figure 3A:
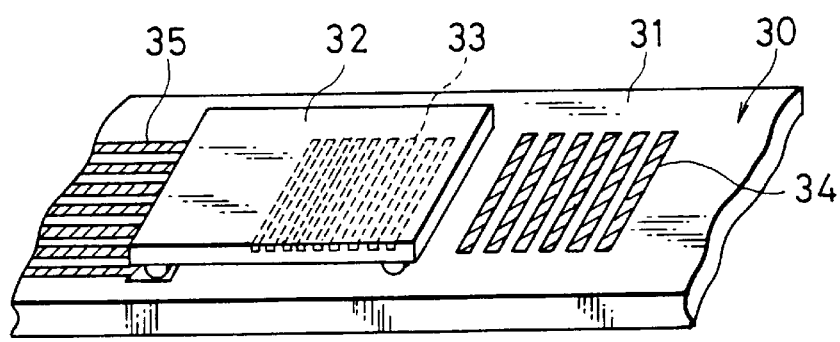
FIGS. 3A and 3B are perspective views of the sensor head and the scale.
Figure 3B:
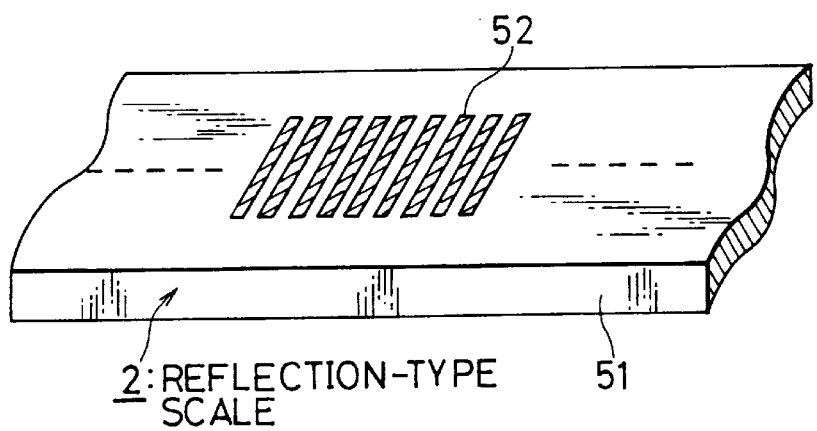

FIGS. 3A and 3B show the enlarged perspective views of the device substrate 30 and the reflection-type scale 2, respectively. The reflection-type scale 2 comprises a transparent substrate 51 such as glass, and scale gratings 52 which are formed of reflection films arrayed along the longitudinal direction of the scale. Output light from the light emitting device 20 is modulated by the index scale 34 on the device substrate 30 to be irradiated to scale 2. The light reflected and modulated by the gratings 52 of the scale 2 is received by the light receiving array 33 mounted on the device substrate 30.

As described above, according to the embodiment, the sensor head 1 is formed as a module unit with the resin-molded block 10, and the light emitting device 20 and the light receiving device substrate 30 mounted thereon. Since necessary interconnection lines are three-dimensionally integrated on the block 10 in advance, the sensor head 1 can be easily and automatically assembled. As a result of the module construction, the sensor head 1 becomes small and thin. In detail, the size of the sensor head 1 becomes such small as that the thickness Z is 10 mm or less, the width in the longitudinal direction of the scale 1 is 10 mm to 15 mm, and the width perpendicular to the longitudinal direction of the scale 1 is about 10 mm.

Figure 4:
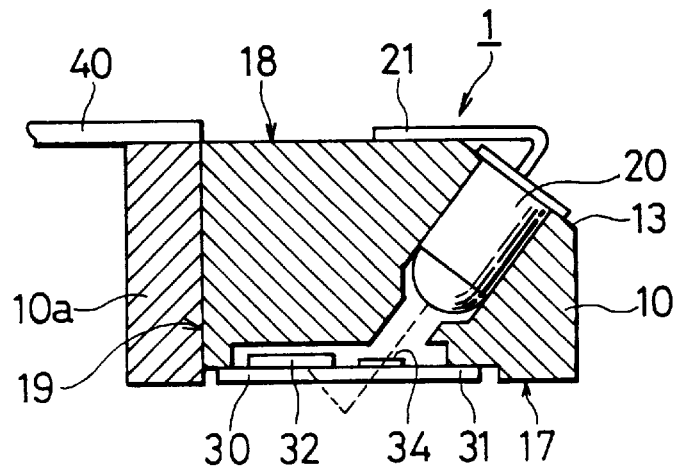
FIG. 4 is a sectional view of a sensor head according to a second embodiment of the present invention.

FIG. 4 shows a sectional view of a sensor head 1 according to another embodiment of the present invention. In FIG. 4, the same reference numbers are used for the corresponding portions equivalent to that in FIG. 1B. In this embodiment, the portion on which the FRC substrate 40 is bonded is formed of another resin-molded block 10a different from the resin-molded block 10. The resin-molded sub-block 10a is bonded on the side wall of the resin-molded main block 10. In this case, the interconnection lines 12 on the side surface 19 of the main block 10 is covered and passivated by the sub-block 10a.

In the above-described embodiments, the MID device was formed by one step molding method. However, a duplication molding process can be used in the present invention. When the duplication molding process is performed in the embodiments, the interconnection lines can be buried in the resin-molded block Therefore, the interconnection lines are protected from damage, contamination, and the like.

Figure 5:
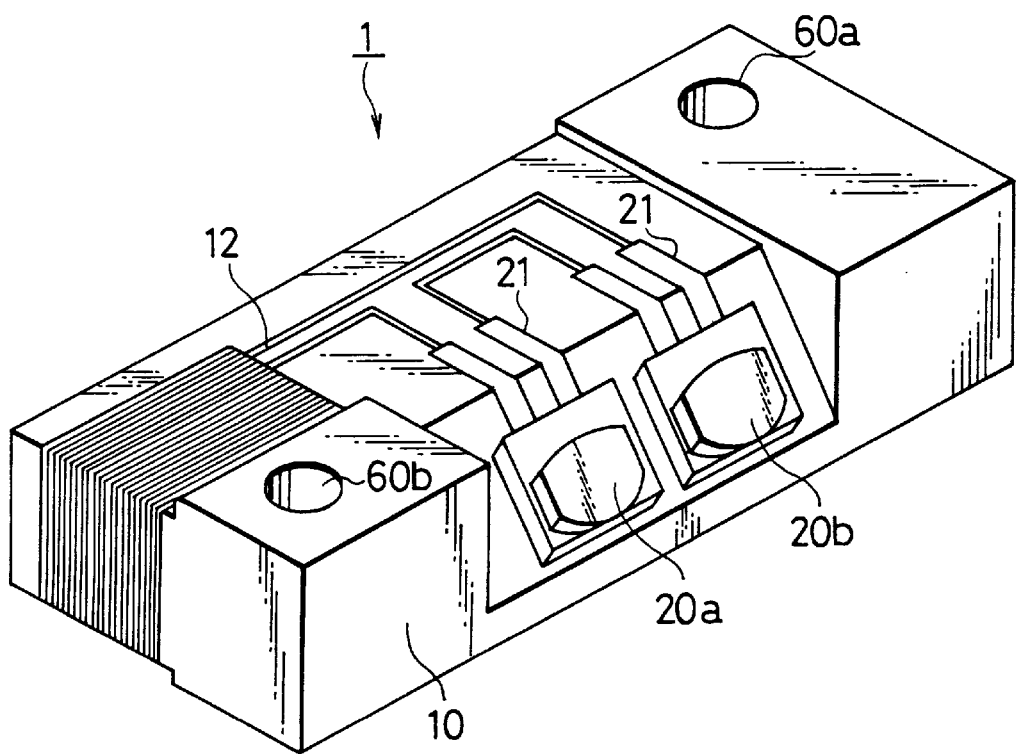
FIG. 5 is a perspective view of a sensor head according to a third embodiment of the present invention.
Figure 6A:
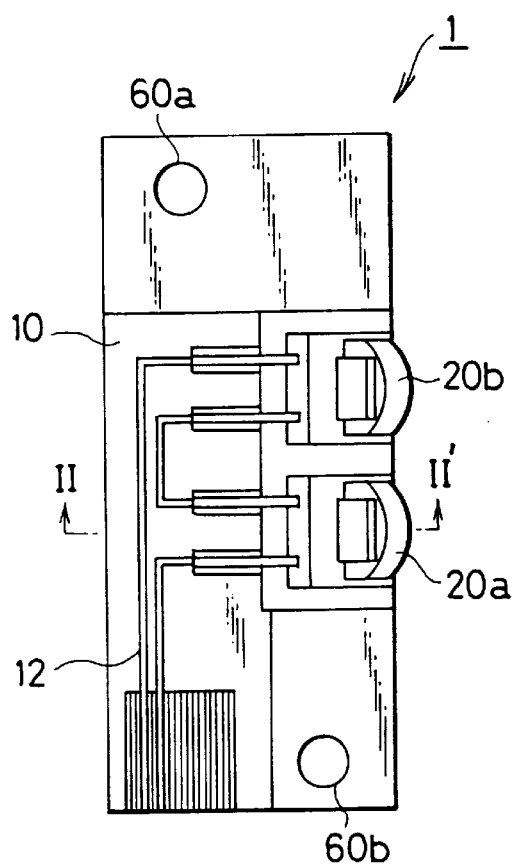
FIG. 6A to 6C are plan view, back view and sectional view of the sensor head in FIG. 5.
Figure 6B:
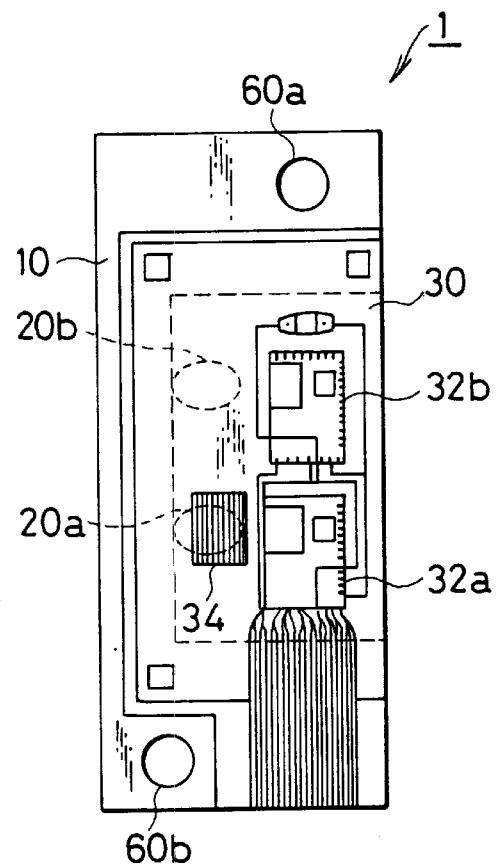
Figure 6C:
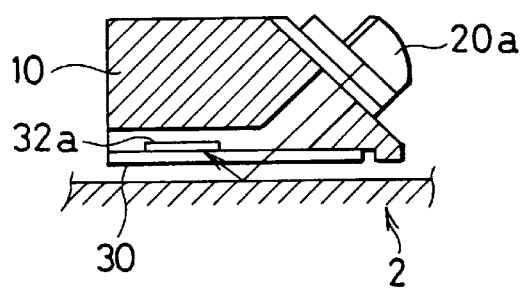

FIG. 5 shows a sensor head 1 according to a third embodiment of the present invention. FIGS. 6A, 6B and 6C are plan view, back view and sectional view at II-II' section of FIG. 6A, respectively. In this embodiment, the same reference numbers are used for the corresponding portions equivalent to that of the above-described embodiment.

In the sensor head according to this embodiment, two light-emitting devices 20a and 20b are mounted on the resin-molded block 10. The light emitting devices 20a and 20b serve for normal displacement measuring and for reference position detecting, respectively.

In a encoder scale, additionally to the scale gratings 52, reference position detecting patterns are formed outside the scale gratings 52, whereby reference position detecting function is added to the encoder. However, in the case of that the optical encoder is small, it becomes difficult that output light of one light emitting device is used for irradiating both the scale gratings and the reference position detecting patterns.

In order to solve the above-described problem, in this embodiment, the light emitting device 20a for displacement measuring and the light emitting device 20b for detecting the reference position are disposed. Corresponding to the above-mentioned light emitting devices arrangement, on the device substrate 30, two IC chips 32a and 32b are mounted for displacement measuring and detecting the reference position, respectively. Otherwise, the present embodiment is similar to the above-described embodiment.

Figure 7:
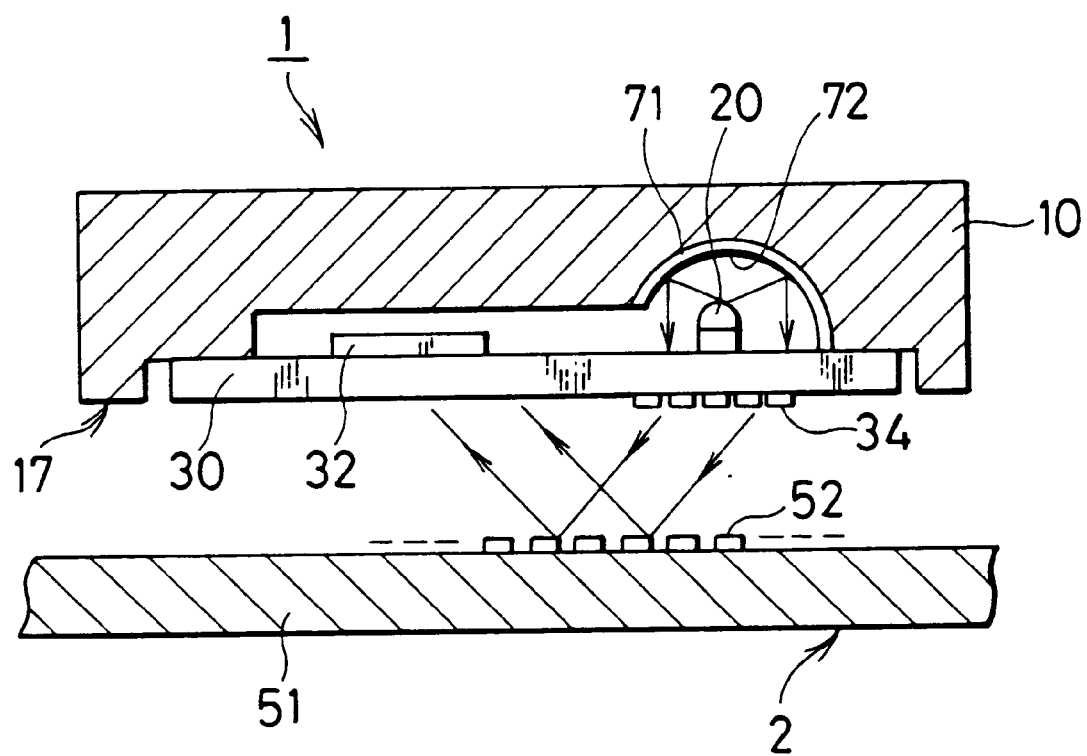
FIG. 7 is a sectional view of a sensor head according to a fourth embodiment of the present invention.

FIG. 7 shows a sectional view of the sensor head 1 according to a fourth embodiment of the present invention. In this embodiment, the light emitting device 20 is not mounted on the resin-molded block 10, but disposed on the device substrate 30 together with the light receiving IC chip 32. Therefore, no holes are formed on the block 10. On the front surface 17 of the resin-molded block 10, a concave portion 71 is formed to be opposed to the scale 2. On the concave portion 71, a reflection film 72 is formed to serve as a concave mirror. The reflection film 72 is formed of the conductive film for the interconnection lines. The concave mirror is irradiated by the light emitting device 20. The reflected light of the concave mirror is diffracted by the index gratings 34 formed on the rear surface of the device substrate 30 to be irradiated to the scale 2.

In this embodiment, interconnection lines are three-dimensionally integrated on the block 10 as similar to the above-described embodiment The light emitting device 20 and the light receiving IC chip 32 mounted on the device substrate 30 are connected to the interconnection lines on the block 10 through the interconnection lines on the device substrate 30.

According to this embodiment the sensor head 1 can be thinned more than the above-mentioned embodiment, for example, to several millimeters. As the reflection film 72, the conductive film plated on the block 10 for interconnection lines can be used. Therefore, it is not necessary to use additional steps that complicates the process of the sensor head 1.

Figure 8A:
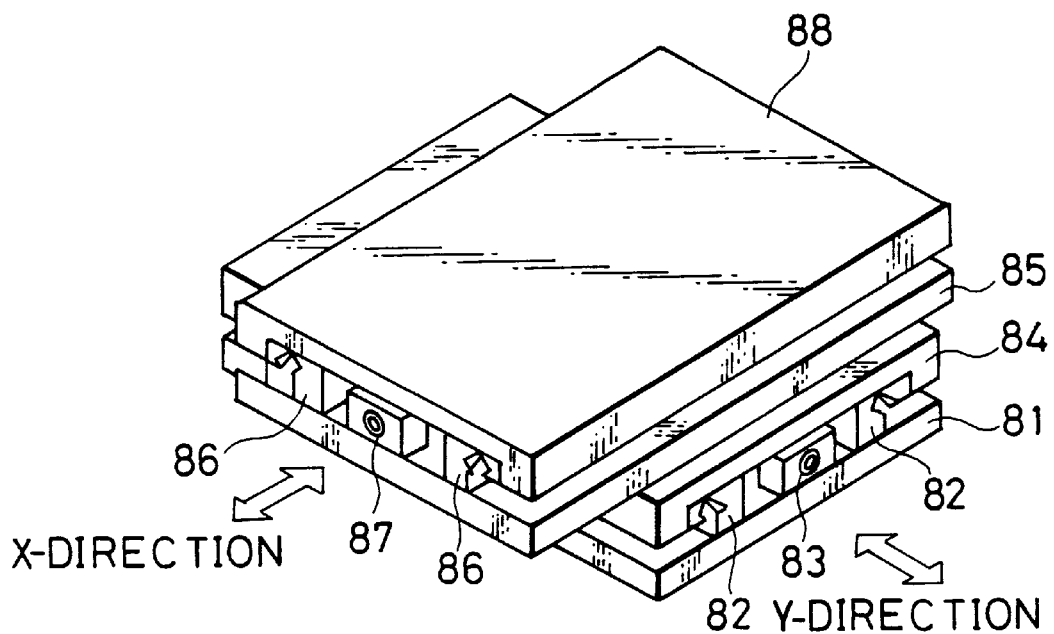
FIGS. 8A and 8B show an X-Y table in which an optical encoder according to the present invention is installed.
Figure 8B:
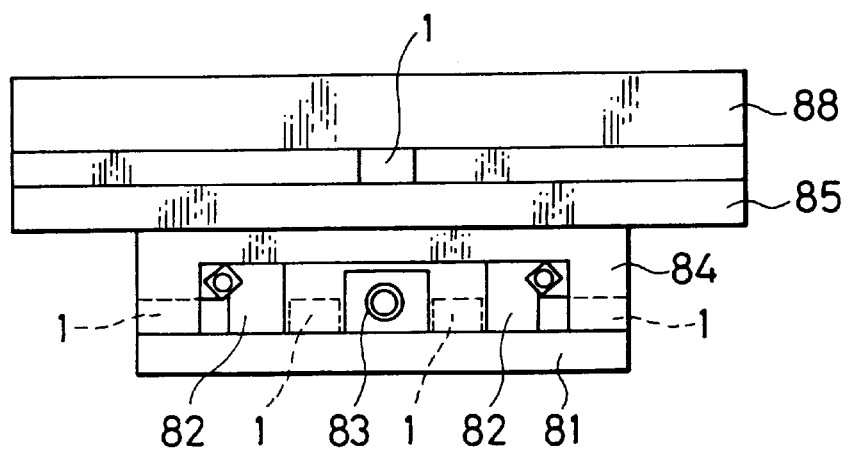

FIGS. 8A and 8B show an X-Y table on which the optical encoder according to the above-described embodiment is installed. FIGS. 8A and 8B are perspective view and side view in Y-direction, respectively. As shown in FIGS. 8A and 8B, a Y-table 84 is attached with a feed screw 83 by guides 82 to a stage 81. Another stage 85 is disposed on the Y-table 84. On the stage 85, an X-table 88 is attached with a feed screw 87 by guides 86. As shown in FIG. 8B, the sensor head 1 of the optical encoder is disposed in a gap between the stage 85 and the X-table 88. One of the sensor head 1 and the scale is formed on the table 88, and the other is formed on the stage 85. Other sensor head positions that can be selected are shown by dot lines in FIG. 8B. Since the sensor head 1 is formed with a small thickness, the sensor head 1 can be disposed in suitable gaps between the table 84 and the stage 81, and between the table 88 and the stage 85, as shown in FIG. 8B.

As described above, according to the present invention, the sensor head of the optical encoder is formed as a module by use of a resin-molded block. Therefore, the sensor head can be small and thin without complicated assembling processes, whereby the reflection-type optical encoder can be automatically assembled with a high mass-productivity.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

The entire disclosure of Japanese Patent Application No. 9-262295 filed on Sep. 26, 1997 including specification, claims, drawings and abstract are incorporated herein by reference in its entirety.

What is claimed is:

1. An optical displacement measuring apparatus comprising a reflection-type scale and a sensor head opposite to the scale with a gap so as to be relatively movable, the sensor head irradiating the scale as to output a displacement signal, wherein the sensor head comprises:

a resin-molded block having a hole, which is opened on a front surface opposed to the scale, and interconnection lines formed thereon;

a light emitting device buried in the hole of the resin-molded block so as to irradiate the scale, the light emitting device being connected to the interconnection lines on the resin-molded block;

a device substrate attached to the front surface of the resin-molded block; and a light detecting device mounted on the device substrate for detecting reflected light from the scale, the light detecting device being connected to the interconnection lines on the resin-molded block, wherein the device substrate is a transparent substrate and the light detecting device is disposed on the transparent substrate so as to be disposed between the resin-molded block and the transparent substrate.

2. The optical displacement measuring apparatus according to claim 1, wherein the interconnection lines are three-dimensionally integrated on the resin-molded block.

3. The optical displacement measuring apparatus according to claim 1, wherein the hole is formed through the resin-molded block from the front surface to the rear surface, the terminals of the light emitting device being connected to the interconnection lines on the rear surface of the resin-molded block.

4. The optical displacement measuring apparatus according to claim 1, wherein the device substrate is a transparent substrate.

5. The optical displacement measuring apparatus according to claim 4, wherein the light receiving device is face-down-bonded on the transparent substrate so as to be disposed between the resin-molded block and the transparent substrate.

6. The optical displacement measuring apparatus according to claim 4, further comprising an index scale formed on the transparent substrate for modulating the output light from the light emitting device.

7. The optical displacement measuring apparatus according to claim 1, further comprising a connecting device bonded on the resin-molded block so as to lead the connecting lines to an external circuit.

8. An optical displacement measuring apparatus comprising a reflection-type scale and a sensor head opposite to the scale with a gap so as to be relatively movable, the sensor head irradiating the scale as to output a displacement signal, wherein the sensor head comprises:

a resin-molded block having a concave mirror formed on a front surface to be opposed to the scale, and interconnection lines;

a device substrate attached to the front surface of the resin-molded block;

a light emitting device mounted on the device substrate for irradiating the concave mirror, the light emitting device being connected to the interconnection lines on the resin-molded block through the device substrate; and a light detecting device mounted on the device substrate for receiving a reflected light from the scale irradiated by the concave mirror, the light detecting device being connected to the interconnection lines on the resin-molded block through the device substrate, wherein the device substrate is a transparent substrate and the light detecting device is disposed on the transparent substrate so as to be disposed between the resin-molded block and the transparent substrate.

9. The optical displacement measuring apparatus according to claim 8, wherein the concave mirror is formed a conductive film which is used for the interconnection lines.

* * * * *